United States Patent
Zhu et al.

(10) Patent No.: US 10,552,438 B2
(45) Date of Patent: *Feb. 4, 2020

(54) TRIGGERING METHOD FOR INSTANT SEARCH

(71) Applicant: Oath Inc., New York, NY (US)

(72) Inventors: Shenhong Zhu, Santa Clara, CA (US);
Kazuhiro Nakao, Sunnyvale, CA (US);
Zhongqiang Chen, San Jose, CA (US);
Chun Ming Sze, Fremont, CA (US);
Huming Wu, San Jose, CA (US);
Farzin Maghoul, Hayward, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,123

(22) Filed: Feb. 28, 2018

(65) Prior Publication Data

US 2018/0203909 A1 Jul. 19, 2018

Related U.S. Application Data

(63) Continuation of application No. 14/720,867, filed on May 25, 2015, now Pat. No. 9,940,372.

(51) Int. Cl.
*G06F 17/30* (2006.01)
*G06F 16/248* (2019.01)

(52) U.S. Cl.
CPC .................. *G06F 16/248* (2019.01)

(58) Field of Classification Search
CPC .................................................. G06F 16/248
See application file for complete search history.

(56) References Cited

U.S. PATENT DOCUMENTS

| | | | |
|---|---|---|---|
| 7,577,665 B2* | 8/2009 | Ramer | G06Q 30/0247 |
| 8,190,627 B2 | 5/2012 | Platt et al. | |
| 8,645,825 B1 | 2/2014 | Cornea et al. | |
| 8,762,356 B1* | 6/2014 | Kogan | G06F 3/023 |
| | | | 707/705 |
| 9,268,857 B2* | 2/2016 | Johnson | H04L 67/10 |

(Continued)

*Primary Examiner* — Debbie M Le
(74) *Attorney, Agent, or Firm* — Pillsbury Winthrop Shaw Pittman LLP (57) ABSTRACT

Techniques are provided for automatically determining when to trigger instant search. In one technique, while a user is entering text to formulate a search query, and prior to receiving an indication that the user has completed formulation of the search query, a search assistant system determines the most popular queries that include the text the user has already entered. The search assistant system then determines whether to proactively provide, to the user, search results for the top-candidate of those completed queries. That determination may take into account factors such as whether the top-candidate qualifies as a dominant completed query, a richness metric determined for the search results for the particular completed query, and/or a satisfaction metric determined for the search results for the particular completed query. If the search assistant system determines to proactively provide search results for the particular completed query, the search results for the particular completed query are presented to the user prior to receiving any indication that the user has completed formulation of the search query.

20 Claims, 4 Drawing Sheets

(56) References Cited

U.S. PATENT DOCUMENTS

| | | | |
|---|---|---|---|
| 9,355,191 B1* | 5/2016 | Finkelstein | G06F 16/90324 |
| 9,361,406 B1 | 6/2016 | Taropa et al. | |
| 9,378,283 B2 | 6/2016 | Batraski et al. | |
| 9,405,856 B2* | 8/2016 | Marantz | G06F 16/90324 |
| 9,430,573 B2 | 8/2016 | Bailey et al. | |
| 9,497,277 B2* | 11/2016 | Sharp | H04L 67/22 |
| 9,613,165 B2 | 4/2017 | Frieden et al. | |
| 9,639,581 B1 | 5/2017 | Taropa et al. | |
| 10,055,418 B2* | 8/2018 | Sharp | G06F 16/14 |
| 2007/0094042 A1 | 4/2007 | Ramer et al. | |
| 2011/0208730 A1 | 8/2011 | Jiang et al. | |
| 2012/0269116 A1 | 10/2012 | Xing et al. | |
| 2018/0349362 A1* | 12/2018 | Sharp | G06F 16/14 |

\* cited by examiner

TRIGGERING METHOD FOR INSTANT SEARCH

CROSS-REFERENCE TO RELATED APPLICATIONS

The present application is a continuation of U.S. patent application Ser. No. 14/720,867 filed May 25, 2015, which is incorporated herein in its entirety.

FIELD OF THE INVENTION

The present invention relates to instant search and, more specifically, to techniques relating to when to begin providing instant search results to users as the users are formulating their search queries.

BACKGROUND

The amount of information that is currently available to search engines is enormous. Given the quantity of information available, it is critical to provide users tools that make finding the right information as quick and easy as possible. Consequently, many techniques have been developed for improving the speed and quality of the searching experience.

One such technique for making the search experience faster and easier is referred to as "instant search". In the context of search assistant systems, "instant search" refers to the technique of showing a search result page to a user even before the user completes entering the search query in a search box.

The usefulness of instant search hinges greatly on whether the search assistant system starts to provide search result pages too early or too late in the user's query formulation. Specifically, if instant search does not start providing search result pages until the user has nearly finished formulating the user's entire search query, then instant search does not save the user much time or effort. On the other hand, providing search result pages too early and too often in the query formulation process consumes screen space, consumes client-side processing power, and is distracting or annoying, without providing any significant benefit. The too-early search result pages provide little benefit because the too-early pages are unlikely to contain results that relate to the searcher's actual interests.

Thus, it is desirable to provide techniques for initiating instant search as soon as, but not before, the search results are likely to be of interest to the user of the search assistant system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for determining when to trigger instant search are described herein. As used herein, the term "trigger" refers to causing the search assistant system to transition from a state in which the search assistant system does not provide instant search results, to a state in which the search assistant system provides instant search results. As explained above, triggering instant search too early wastes computing resources and impairs the user's search experience, while triggering instant search too late reduces the benefit of instant search.

Figure 1:
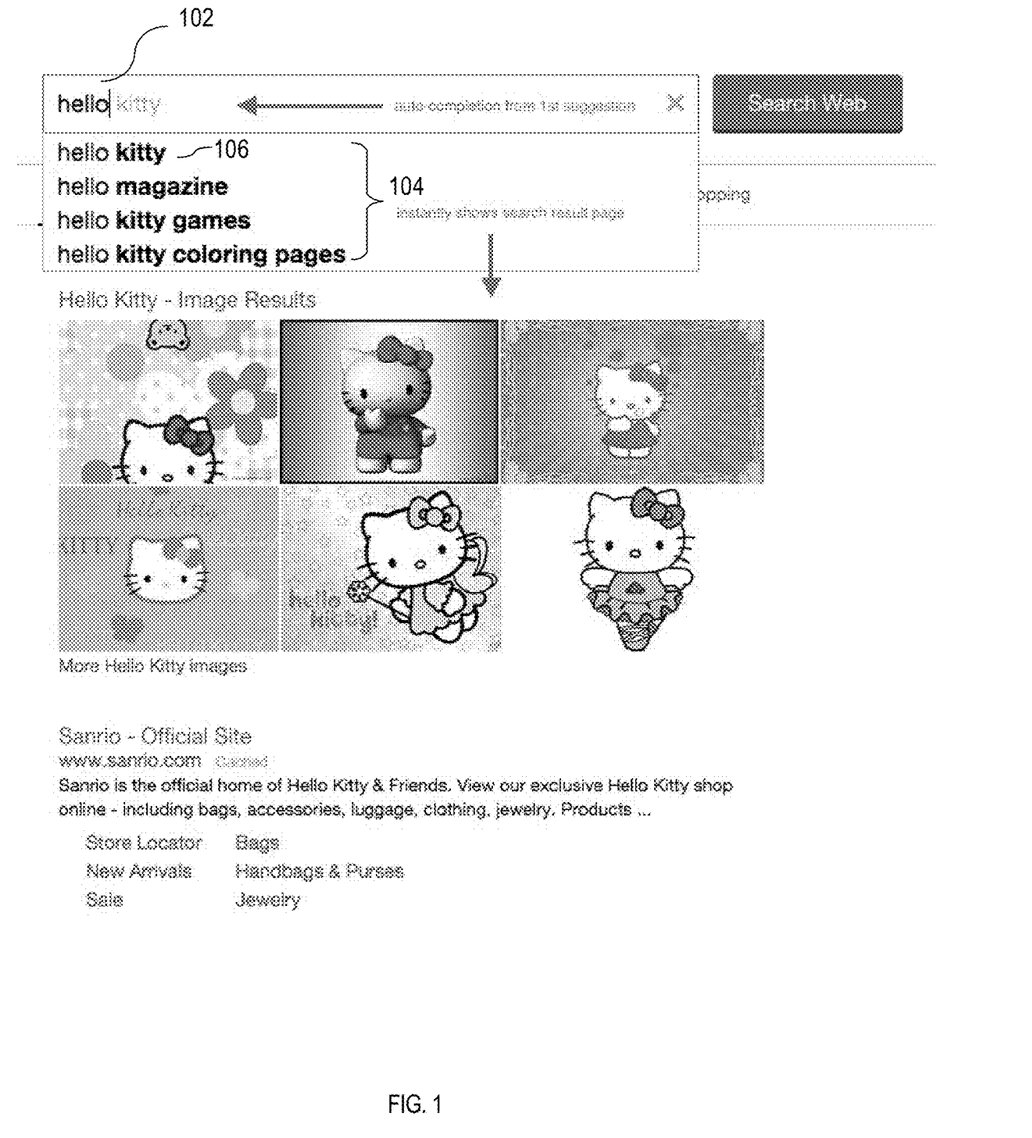
FIG. 1 is a block diagram of a web page that includes (a) a search box containing an incomplete search query and (b) instant search results that are based on the incomplete search query in the search box, according to one embodiment.

According to one embodiment, a search assistant system first predicts the intent of a user that is formulating a query based on user input in a search box. For example, the search assistant system may predict the user's search intent every time a user enters a keystroke into a search box. The prediction may involve identifying, based on what the user has typed in the search box so far, the queries that have the highest likelihood to match the user's search intent. For example, as illustrated in FIG. 1, if the uncompleted query 102 is "hello", the search assistant system may predict that the completed query is likely to be one of "hello kitty", "hello magazine", "hello kitty games" and "hello kitty coloring pages".

The queries that are determined to have the highest likelihood to match the user's intent are referred to herein as the "completed-query-candidates". The completed-query-candidates for a given uncompleted query are collectively referred to as the "completed-query-set" of the uncompleted query. In the example illustrated in FIG. 1, the completed-query-set 104 for the uncompleted query 102 "hello" includes "hello kitty", "hello magazine", "hello kitty games" and "hello kitty coloring pages".

According to one embodiment, the search assistant system ranks the completed-query-candidates based on the likelihood that they represent the user's search intent. The completed-query-candidate that has the highest likelihood of representing the user's search intent is referred to herein as the "top-candidate". In the example illustrated in FIG. 1, "hello kitty" is the top-candidate 106 for the uncompleted query 102 "hello".

According to one embodiment, once the completed-query-set and the top-candidate for the uncompleted query is determined, the search assistant system then determines whether to trigger instant search based on whether the top-candidate is likely to produce high quality search results. The determination of whether the top-candidate is likely to produce high quality search results may be based on a variety of factors, including but not limited to (a) whether the top-candidate qualifies as a dominant completed query, (b) a richness metric determined for the search results for the top-candidate; and/or (c) a satisfaction metric determined for the search results for the top-candidate. Each of these factors shall be described in greater detail hereafter.

If the search assistant system determines that the top-candidate is not likely to produce high quality search results, then the search assistant system refrains from providing instant search results to the user. In response to determining that the top-candidate is likely to provide high quality search results, the search assistant system provides to the user a high quality search result page instantly, without waiting for the user to complete the search query, and without overloading the back-end search engine(s).

Search Assistant Functional Overview

Figure 2:
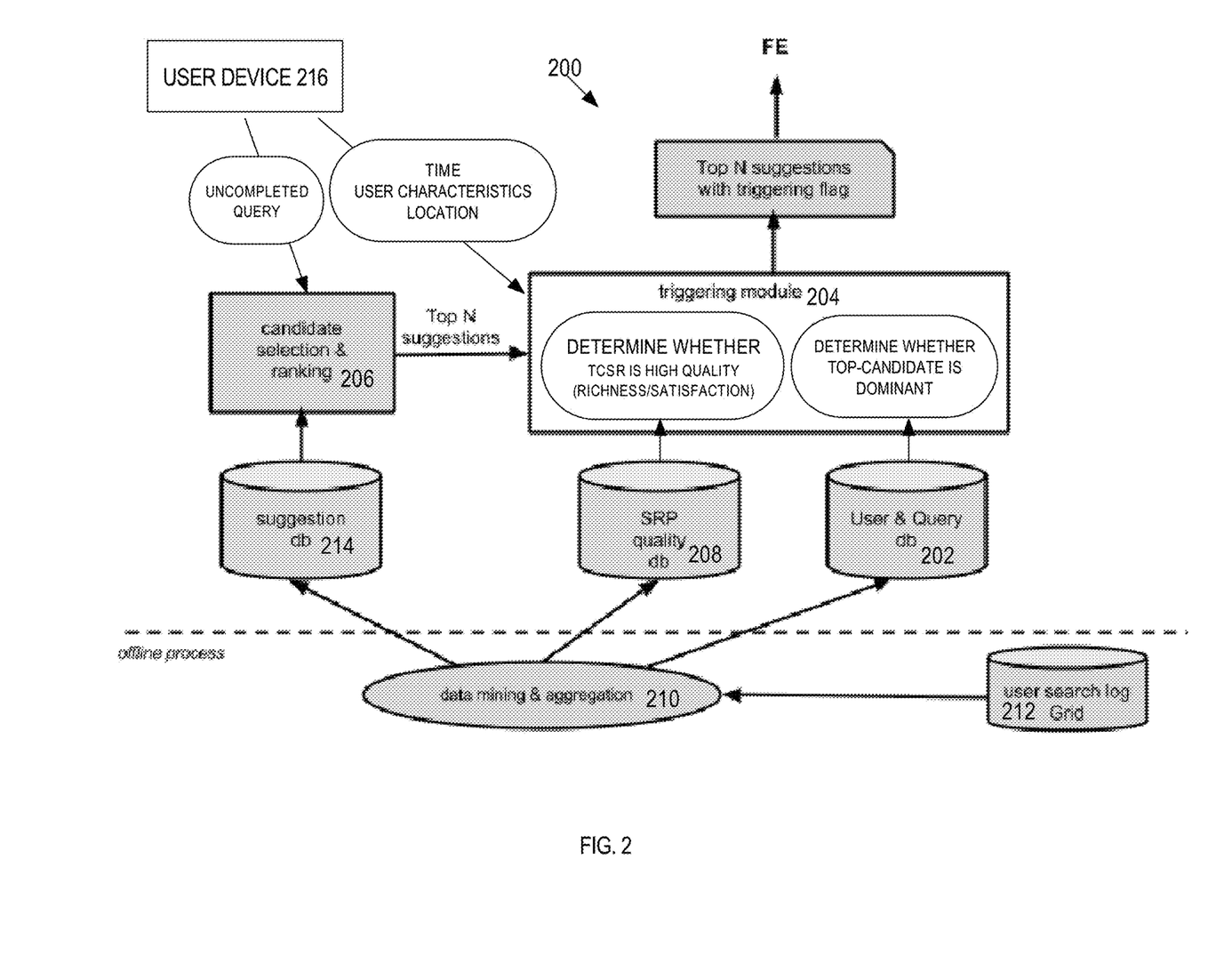
FIG. 2 is a block diagram of a system for use in determining when to trigger the use of instant search, according to one embodiment.

Referring to FIG. 2, it is a block diagram of a search assistant system 200 according to one embodiment. In the illustrated embodiment, in addition to providing an auto-completion feature based on user partial input in a search box, search assistant system 200 further enhances the search experience by integrating the feature of instant search. However, rather than invoke the instant search feature at every keystroke of the user, search assistant system 200 is configured to trigger instant search only when the benefits provided by instant search are determined to outweigh the overhead consumed by instant search. Specifically, according to one embodiment, search assistant system 200 is configured to determine when to trigger instant search using the technique illustrated in the flowchart of FIG. 3.

Figure 3:
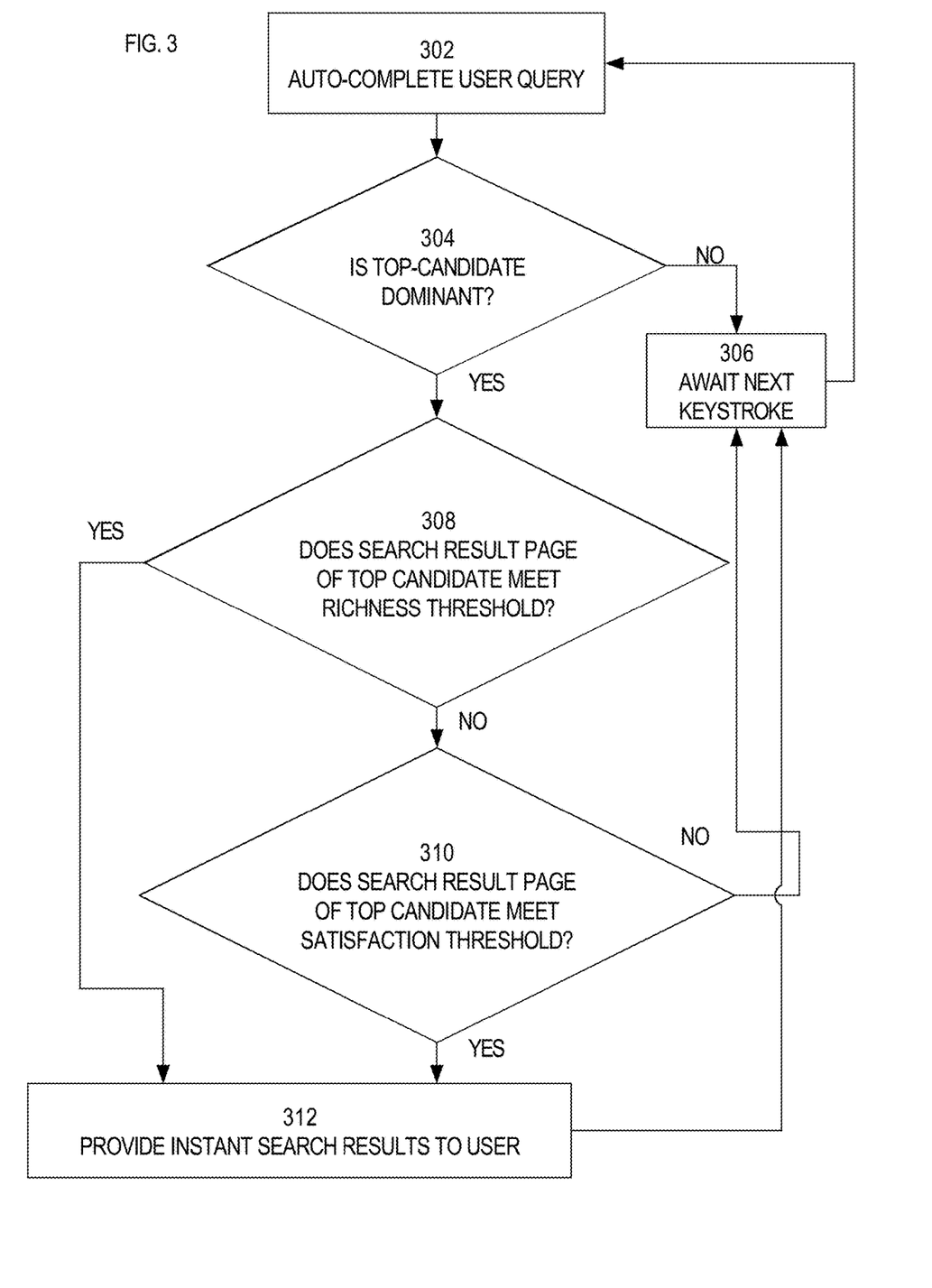
FIG. 3 is a flowchart illustrating steps for determining whether to trigger instant search, according to one embodiment.

Referring to FIG. 3, at step 302, search assistant system 200 auto-completes the user query, which is typically partial and incomplete, by identifying the completed-query-set for the uncompleted user query. At step 304, search assistant system 200 determines whether the top-candidate in the completed-query-set is "dominant". According to one embodiment, the top-candidate qualifies as dominant if the probability that the user that is formulating the search query intends to issue the top-candidate exceeds a certain threshold.

If search assistant system 200 determines that the top-candidate in the completed-query-set is dominant, then control passes to step 308. If search assistant system 200 determines that the top-candidate in the completed-query-set is not dominant, then control passes to step 306, where the search assistant system 200 awaits the user's next keystroke. At the user's next keystroke, control passes from step 306 back to step 302.

At step 308, the search assistant system 200 determines whether the search result page that would be produced by the top candidate meets a richness threshold. If the search result page that would be produced by the top candidate meets a richness threshold, then control passes to step 312 where instant search is triggered. The triggering of instant search causes search results based on the top-candidate to be sent to the user. After providing the instant search results, control passes back to step 306.

If, at step 308, the search result page that would be produced by the top-candidate does not meet the richness threshold, then control passes to step 310. At step 310 it is determined whether the search result page of the top-candidate meets a satisfaction threshold. If the search result page that would be produced by the top candidate would meet the satisfaction threshold, then control passes to step 312 where instant search is triggered. As explained above, the triggering of instant search causes search results based on the top-candidate to be instantly sent to the user. After providing the instant search results, control passes back to step 306.

If, at step 310, the search result page that would be produced by the top-candidate does not meet the satisfaction threshold, then control passes to step 306 where search assistant system 200 awaits the next keystroke without triggering instant search. Thus, in the embodiment illustrated in FIG. 3, instant search is triggered if and only if (top-candidate is dominant) and either (richness threshold satisfied) or (satisfaction threshold satisfied).

The embodiment illustrated in FIG. 3 is merely one of several ways candidate dominance, predicted richness and predicted satisfaction may be used as factors in determining whether to trigger instant search. The techniques described herein are not limited to any particular formula that uses these factors. For example, in alternative embodiments, instant search may be triggered if and only if all three factors (dominance, richness and satisfaction) are satisfied. In yet another alternative, instant search may be triggered if any one of the three factors is satisfied. Examples of how each of these three factors may be determined are given in greater detail hereafter.

Dynamically Varying Trigger Conditions

According to one embodiment, the factors that must be satisfied to trigger instant search, and/or the thresholds used by the factors, vary dynamically over time. The variables that cause the trigger conditions to change may include, for example, environmental factors such as the time of day, the current load on the search engines, etc.

For example, in one embodiment: when the current load on the search engines is low, satisfying any one of the three factors (dominance, richness and satisfaction) triggers instant search. On the other hand, when the current load on the search engines is high, all three factors have to be satisfied in to trigger instant search.

In yet another embodiment, the factors that need to be satisfied to trigger instant search do not change, but the thresholds do. For example, when the current load on the search engines is low, the thresholds for satisfying "dominance", "richness" and/or "satisfaction" may be relatively low. On the other hand, when the current load on the search engines is high, the thresholds for satisfying "dominance", "richness" and/or "satisfaction" are relatively high.

Determining Whether the Dominance Factor is Satisfied

Referring again to FIG. 2, search assistant system 200 includes a user and query database 202 (hereafter "U&Q database 202"). According to one embodiment, U&Q database 202 contains information about query and user behavior. For example, for each query, U&Q database 202 has records that indicate when, where and how many users have issued the query in question.

Search assistant system 200 also includes triggering module 204. Triggering module 204 examines the queries in the completed-query-set (provided by candidate selection and ranking module 206) and determines if the top-candidate is "dominant" based on the information contained in U&Q database 202.

For example, as illustrated in FIG. 1, a user's query "hello" has four completed-query-candidates. Based on the information contained in U&Q database 202, triggering module 204 may determine that intent probabilities for each of those four follows:
- hello kitty 0.65
- hello magazine 0.26
- hello kitty games 0.07
- hello kitty coloring pages 0.02

Based on the information in U&Q database 202, the triggering module 204 can also determine that the top-candidate "hello kitty", is the most wanted query for the user's partial input "hello". By comparing the intent probability of "hello kitty" with the intent probability of the other completed-query-candidates, triggering module 204 may determine that "hello kitty" is dominant ("hello kitty's" intent probability of 0.65 is much higher than those of the other completed-query-candidates). Based on this determination, the search assist system 200 auto-completes the query "hello" as "hello kitty" and may instantly load and show the search result page for "hello kitty".

As another example, assume that the user's partial query is "test". The completed-query-set for "test" may include four completed-query-candidates: "test", "testosterone", "testosterone supplements" and "test internet speed". Based on the information from U&Q database 202, triggering module 204 may determine the intent probabilities to be:
- test 0.33
- testosterone 0.31
- testosterone supplements 0.24
- test internet speed 0.12

Clearly, the search intent of the top-candidate "test" is not dominant, as its intent probability 0.33 is more or less the same as that of second completed-query-candidate.

The User and Query Database

As mentioned above, triggering module 204 determines whether a top-candidate is dominant based on information from U&Q database 202. According to one embodiment, U&Q database 202 includes several features which help triggering module 204 calculate the intent probabilities among the completed-query-candidates and determine whether the instant search should be triggered. For example, U&Q database 202 may include information about:
- query frequency per time/location info, which is mined from user search logs, and is aggregated in certain time period, for example, 30 or 90 days, and
- Individual user search history & query patterns The U&Q database 202 may include information such as the time each query was submitted, the location from which each query was submitted, and the user that submitted the query. Consequently, whether a particular top-candidate for a particular uncompleted query is dominant may change based on the time, location or type of user. In FIG. 2, the time, user characteristics and location information for a particular uncompleted query are provided by user device 216. However, in alternative embodiment, this information may come from an intermediary server with which user device 216 is interacting.

As an example of how time, location, or user type can affect the dominance determination made by triggering module 204, assume that the uncompleted query is "hello" and the user is male. Under these circumstances, based on the information contained in U&Q database 202 about queries submitted by males, "hello kitty" may not be dominant for the query "hello". On the other hand, based on the information contained in U&Q database 202 about queries submitted by females, "hello kitty" may be dominant for the query "hello".

As yet another example, "hello kitty" may be dominant for "hello" queries formulated between 3 pm and 6 pm, but not dominant for "hello" queries formulated at other times in the day. Similarly, "hello kitty" may be dominant for "hello" queries that originate in Arizona, but not dominant for "hello" queries that originate in New York. As illustrated in these examples, the dominance determination may be based on query frequencies that only take into account queries that were submitted at a particular time, by a particular type of user, and/or from a particular location or type of location (e.g. city vs rural).

Further, it is possible that the top-candidate itself changes based on time, location, or type of user. For example, the top-candidate for "c" may be "coffee" in the morning, but something else at night. Similarly, the top-candidate for "new" may be "New York Times" for queries that originated in New York, but something else for queries that originated in California. In addition, gender is merely one example of a user attribute that may be used to filter the queries for the purposes of determining top-candidate and dominance. Virtually any information know about users may be used, including but not limited to age, hobbies, individual search history, user group memberships, etc.

As an example of how information stored in the U&Q database 202 may be used, assume that a user's partial input or prefix is 'tom'. Based on this partial input, the candidate selection and ranking module 206 may provide triggering module 204 the top N (e.g., 4) completed-query-candidates as follows:
- tom brady
- tom cruise
- tom and jerry
- tom selleck Upon receiving these completed-query-candidates, the triggering module 204 calculates the approximate intent probability of each completed-query-candidate and determines if top-candidate, "tom brady" in the above example, dominates other completed-query-candidates.

For the purpose illustration, assume that the information within U&Q database 202 indicates that of 100 people that type 'tom', 60 people would search for "tom brady" and 20 people would seek 'tom cruise'. Based on this, the intent probability of the first completed-query-candidate, "tom brady", can be computed as 60/100=0.6. If a threshold (e.g., 0.6) is further specified to define the dominant intent, then completed-query-candidate "tom brady" can be considered as the dominant intent for query "tom" as its probability 0.6 exceeds or equals to the threshold. As a result, the instant search is triggered with "tom brady" as search query, and it would match the intent of majority of people. On the other hand, if the threshold is 0.68, then the first completed-query-candidate is no longer dominant and therefore instant search will not be triggered.

Dynamically Varying Threshold for Determining Dominance

In the examples given above, the threshold for determining whether the top-candidate was dominate was constant (either 0.6 or 0.68). However, the probability threshold does not need to be a constant. For example, in alternative embodiments, the threshold used to determine dominance can be a function of prefix length and/or number of completed-query-candidates available. For example, the threshold for dominant intent could be defined as:

dominant-intent-threshold=alpha*query-length+beta where, "query-length" is the length (in number of characters) of the user's partial query, and alpha and beta are constants that can be determined based on information from user search log. Generally speaking, when the length of user's query is short, the user's intent is vague and diverse. In order for a completed-query-candidate to be dominant, the threshold should be high. On the contrary, when the length of user's query is long, the user's intent is more obvious and narrow. Therefore, when the length of the user's query is long, a lower threshold can be used to determine the dominant intent. Based on this observation, an embodiment can, for example, establish that the threshold for query length 2 is 0.65 while the threshold is 0.41 for query length 62. Under these circumstances, the alpha and beta can be derived as:

alpha=(0.65−0.41)/(2−62)=−0.004, beta=(0.65+2*0.004)=0.658

Therefore, the relationship between dominant intent threshold and query length can be expressed as:

dominant-intent-threshold=−0.004*query-length+ 0.658

Based on this formula, the threshold should be 0.646 when the length of user's partial query is 3. Consequently, search assist will not trigger instant search for query "tom" because the intent of its first completed-query-candidate "tom brady" is not dominant (0.6<0.646). In the same manner, the threshold becomes 0.638 when the length of user's query is 5. Thus, for query "hello", which is 5 in length, the search assistant will trigger instant search as the intent probability of its first completed-query-candidate "hello kitty" is dominant (i.e., 0.65>0.638).

According to one embodiment, there is a minimum threshold below which the dominant-intent-threshold is not permitted to go. For example, assume that the minimum threshold is 0.4. Under these circumstances, if the user's query becomes so long that the dominant-intent-threshold would fall below 0.4, then 0.4 is used as the dominant-intent-threshold.

In addition to query length, the threshold for dominant intent can be defined to depend on number of completed-query-candidates as well. In one embodiment, this is accomplished by deriving different alpha and beta values based on the number of available completed-query-candidates. It is evident that the smaller the number of available completed-query-candidates is, the easier it is for the top-candidate to be dominant. Thus, it is reasonable to set the threshold for dominant intent higher when there are less available completed-query-candidates. One possible way, for example, to define threshold based on both query length and number of completed-query-candidates could be:

dominant-intent-threshold=−0.004*query-length+ 0.658 when number of completed-query-candidate>=4

−0.004*query-length+0.708 when number of completed-query-candidate=3

−0.004*query-length+0.758 when number of completed-query-candidate=2

Determining Intent Probability

As explained above, dominance is determined by comparing the top-candidate's intent probability against a dominant-intent-threshold. As also explained above, the triggering module 204 may determine the top-candidate's intent probability based on information from U&Q database 202. According to one embodiment, a users' intent, given a prefix, can be calculated by query frequency:

$ip(x)$=freq$(x)$/Σfreq$(i)$,$(i=1, \ldots ,N$ and $N$ is the number of completed-query-candidates)

For example, if query frequency of "tom brady" is 60, "tom cruise" is 20, and "tom and jerry" is 10 and "tom selleck" is 10 in U&Q database 202, the intent probability for "tom brady" given a prefix "tom" is 0.6 by using the above formula.

In an alternative embodiment, triggering module 204 can put more weight on the recent query frequency when calculating intent probability. For example:

popularity-of-query=$a$*count_in_the_last_week+ $b$*whole_count for example $a$=100, and $b$=1 intent probability=popularity-of-query$(x)$/ Σpopularity-of-query$(i)$,$(i=1, \ldots ,N)$

The Richness Metric

As mentioned above, "richness" may be a factor used by triggering module 204 to determine whether to trigger instant search. In the context of search assistant system 200, "richness" is a measure of the quality/diversity of content contained in the search results that would be produced by the top-candidate. Those search results are referred to herein as "top-candidate-search-results" or TCSR. According to one embodiment, triggering module 204 determines the richness of the TCSR based on information obtained from search result page quality database 208 (hereafter "SRPQ database 208").

According to one embodiment, SRPQ database 208 contains information about the search result pages produced by queries. For example, the information from SRPQ database 208 indicates whether a search result page contains a Knowledge Graph, Direct Displays of video or image, or news etc., and their positions. The information in SRPQ database 208 is regularly mined and aggregated from user search logs and integrated periodically into the instant search system described in this invention. In summary, the information contained in SRPQ database 208 helps the triggering module 204 determine whether the TCSR is high quality search result page, and therefore worthy of showing instantly to the user.

For example, as illustrated in FIG. 1, the search result page of the top-candidate "hello kitty" for the partial query "hello" contains image Direct Display and information about the Sanrio site—the official site of hello kitty and friends. Clearly, the search result page has rich and authoritative information. Based on this information, triggering module 204 may assign the TCSR a high richness metric, and therefore decide to load the TCSR instantly when user's input is "hello".

The Satisfaction Metric

Instead of or in addition to the richness metric, triggering module 204 may use a satisfaction metric to determine whether the TCSR is of sufficient quality to trigger instant search. The satisfaction metric is a measure of the likelihood that the user will find the TCSR to be useful. The satisfaction metric may be calculated, for example, on how often prior users have found the contents of the TCSR to be useful, as evidenced, for example, by how frequently users have clicked any of those contents. In one embodiment, triggering module 204 obtains historical click information from U&Q database 202.

In addition to the click-through information for the TCSR, user satisfaction may also take into account algorithmic results that indicate high satisfaction, such as the average "dwell time" users have spent when presented with the TCSR, etc.

The Search Result Page Quality Database

According to an embodiment, SRPQ database 208 includes several features used by triggering module 204 to determine both the richness metric and the satisfaction metric. For example, as explained above, SRPQ database 208 may include information that indicates whether the TCSR contains rich information such as Knowledge Graph, or Direct Display of video, image, or news etc. In one embodiment, SRPQ database 208 maintains this information per query, and aggregated by certain period, for example, last 30 or 90 days.

With respect to clicks, U&Q database 202 may indicate whether the TCSR has a good click-through-rate ("CTR"). Database may include several types of CTR statistic for any given TCSR, such as overall CTR, CTR on the first algorithmic result, CTR on Direct Display, CTR on ads, etc. In one embodiment, this CTR information is recorded for each query, and aggregated by certain period.

The Triggering Module

As explained above, triggering module 204 determines whether to trigger instant search based on both intent probability (dominance) and search result page quality (richness and satisfaction) features. Triggering module 204 itself may be implemented in a variety of ways, including an embodiment in which triggering module 204 is implemented as a rule-based triggering function, and another embodiment in which triggering module 204 uses a machine learning model to determine whether to trigger instant search. In yet another embodiment, triggering module 204 may include a combination of both rule-based and machine-learned model triggering mechanisms.

With respect to an embodiment that uses a rule-based triggering mechanism, rules can be defined based on dominant intent and richness of information in search result page. For example, a simple rule based triggering mechanism for instant search can be set up as: Trigger instant search if and only if:
    user intent of top-candidate for the user query is dominant
       (that is, intent probability of top-candidate>=threshold)
       AND EITHER
    richness of information in TCSR is high (i.e., total number
       of direct displays, knowledge graph, answers, quick
       links, or number of ads is larger than a threshold), OR
    user's satisfaction on TCSR is high (e.g., average page
       dwell time and click through rate is higher than given
       thresholds)
This rule may be implemented corresponds to the flowchart of FIG. 3, described above.

In embodiments where triggering module 204 makes the triggering decision based on machine-learned models, the models can be built in several ways. For example, a Support Vector Machine (SVM) could be used in the following way to construct a model:

First, a training set is built, which is a collection of judgments in the form of "partial query, its related completed-query-candidates, a label to indicate whether or not Instant Search should be triggered". Each judgment data is then translated into a vector of features, x, that includes:
    intent probability,
    feature values derived from search result page,
    a label y (which could be 1 for triggering Instant Search
    and 0 otherwise), A model is then built on the training data. After model training, the function $y=f(x, \alpha)$ is obtained, where $\alpha$ represents the parameters of the function. The returned value of the function is mapped into a flag with binary values (that is, either 0 or 1) to indicate whether instant search should be triggered. For explanation purpose, the vector of features used in building a SVM model could be:
    vector of features=(length of query, length of first completed-query-candidate, highest intent probability, lowest intent probability, existence of knowledge graph on search result page, number of direct displays at top, number of direct displays at right, number of direct displays at middle, quick links, number of search results in search result page, click through rate on search result page, average dwell time on search result page, number of ads at top, number of ads at right, . . . )

Using this vector of features and Hence, the vector of features for query "hello" and its label would look like:
(5, 11, 0.65, 0.02, 0, 6, 0, 0, 1, 10, 0.5, 10.0, 0, 0, . . . )=>yes for triggering instant search.

Similarly, the vector of features for query "test' and its label would look like:
(4, 4, 0.33, 0.12, 0, 0, 0, 0, 0, 10, 0.1, 5.0, 0, 0, . . . )=>no for triggering instant search.

According to one embodiment, the rule-based triggering mechanism and machine-learned model based triggering mechanism are integrated together. For example, in such an embodiment, instant search will be triggered if either the rule based mechanism or machine learned model indicates that it is good to present the TCSR to the user.

User Monitoring and Data Acquisition

As explained above, triggering module 204 makes the decision of whether to trigger instant search based on search result page quality information obtained from SRPQ database 208, and user and query information obtained from U&Q database 202. For this to happen, SRPQ database 208 and U&Q database 202 have to be populated with the necessary information. Populating U&Q database 202 and SRPQ database 208 with information, and keeping that information up to date, may be accomplished by continuously monitoring user behavior to obtain information such as click through rate, and dwell time on search result pages. In the search assistant system 200 illustrated in FIG. 2, a data mining and aggregation module 210 is responsible for mining data from user search logs 212, performing any desired aggregation on the data, and storing the data into U&Q database 202 and SRPQ database 208.

In addition to obtaining information such as click through rates and dwell time, data mining and aggregation module also determines from the user search log 212 which queries are being issued by users. The information obtained about the queries that are being issued by users is stored in suggestion database 214, and used by candidate selection and ranking module 206 to determine the candidate-query-set for any given uncompleted query. As has been described above, the information provided by candidate selection and ranking module 206 is used by triggering module to determine the top-candidate, and to determine whether the top-candidate is dominant.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
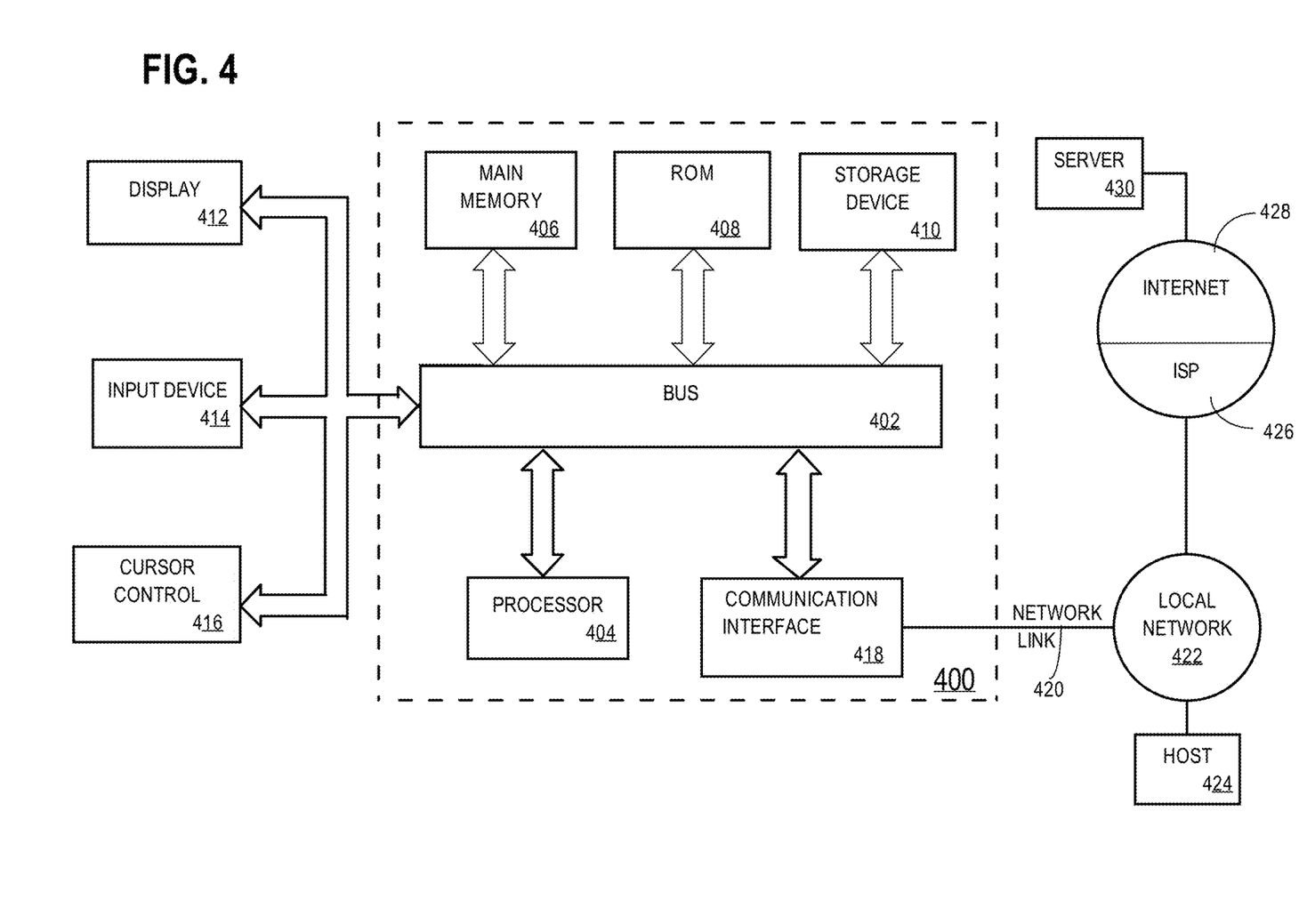
FIG. 4 is a block diagram of a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented on a machine having at least one processor, storage, and a communication platform connected to a network for providing search results, the method comprising:
   receiving a portion of a query from a user;
   obtaining, based on a first criterion, a plurality of complete queries, each of which includes the portion of the query;
   determining whether one of the plurality of complete search queries satisfies a second criterion;
   in response to at least one of the plurality of complete search queries satisfying the second criterion
      presenting, prior to the query being completed by the user, search results obtained based on the one of the plurality of complete search queries; and
   in response to the plurality of complete search queries violating the second criterion waiting for further input about the query from the user.

2. The method of claim 1, wherein the first criterion corresponds to one of a time at which the user issues the portion of the query, a location of the user, and characteristics of the user.

3. The method of claim 1, wherein the second criterion corresponds to the one of the plurality of complete search queries having an intent value greater than an intent threshold.

4. The method of claim 3, wherein the intent threshold varies with respect to one of time, and a load in a search engine.

5. The method of claim 3, wherein the intent threshold is determined based on at least one of a length of the portion of the query, and a number of complete queries included in the plurality of complete search queries.

6. The method of claim 1, wherein the second criterion corresponds to a richness metric associated with the search results obtained for the one of the plurality of complete search queries exceeding a predetermined richness threshold.

7. The method of claim 6, wherein the richness metric is based on a type of content included in the search results for the one of the plurality of complete search queries.

8. The method of claim 1, wherein the second criterion corresponds to a satisfaction metric associated with the search results obtained for the one of the plurality of complete search queries exceeding a predetermined satisfaction threshold.

9. The method of claim 8, wherein the satisfaction metric associated with the search results is determined based on a frequency of previous user's interaction with the search results.

10. A non-transitory machine-readable medium having information recorded thereon for providing search results, wherein the information, when read by the machine, causes the machine to perform operations comprising:
    receiving a portion of a query from a user;
    obtaining, based on a first criterion, a plurality of complete queries, each of which includes the portion of the query;
    determining whether one of the plurality of complete search queries satisfies a second criterion;
    in response to at least one of the plurality of complete search queries satisfying the second criterion
       presenting, prior to the query being completed by the user, search results obtained based on the one of the plurality of complete search queries; and
    in response to the plurality of complete search queries violating the second criterion
       waiting for further input about the query from the user.

11. The medium of claim 10, wherein the first criterion corresponds to one of a time at which the user issues the portion of the query, a location of the user, and characteristics of the user.

12. The medium of claim 10, wherein the second criterion corresponds to the one of the plurality of complete search queries having an intent value greater than an intent threshold.

13. The medium of claim 12, wherein the intent threshold varies with respect to one of time, and a load in a search engine.

14. The medium of claim 12, wherein the intent threshold is determined based on at least one of a length of the portion of the query, and a number of complete queries included in the plurality of complete search queries.

15. The medium of claim 10, wherein the second criterion corresponds to a richness metric associated with the search results obtained for the one of the plurality of complete search queries exceeding a predetermined richness threshold.

16. The medium of claim 15, wherein the richness metric is based on a type of content included in the search results for the one of the plurality of complete search queries.

17. The medium of claim 10, wherein the second criterion corresponds to a satisfaction metric associated with the search results obtained for the one of the plurality of complete search queries exceeding a predetermined satisfaction threshold.

18. The medium of claim 17, wherein the satisfaction metric associated with the search results is determined based on a frequency of previous user's interaction with the search results.

19. A system having at least one processor, storage, and a communication platform for providing search results, the system comprising:
   a candidate selection unit implemented by the at least one processor and configured to:
      receive a portion of a query from a user, and
      obtain, based on a first criterion, a plurality of complete queries, each of which includes the portion of the query; and
   a triggering unit implemented by the at least one processor and configured to:
      determine whether one of the plurality of complete search queries satisfies a second criterion,
      in response to at least one of the plurality of complete search queries satisfying the second criterion
      present, prior to the query being completed by the user, search results obtained based on the one of the plurality of complete search queries, and
      in response to the plurality of complete search queries violating the second criterion
      wait for further input about the query from the user.

20. The system of claim 19, wherein the second criterion corresponds to the one of the plurality of complete search queries having an intent value greater than an intent threshold.

* * * * *